United States Patent
Mao

[15] 3,653,745
[45] Apr. 4, 1972

[54] CIRCUITS FOR DRIVING LOADS SUCH AS LIQUID CRYSTAL DISPLAYS

[72] Inventor: Roger Alain Mao, Somerville, N.J.
[73] Assignee: RCA Corporation, New York, N.Y.
[22] Filed: June 11, 1970
[21] Appl. No.: 45,508

[52] U.S. Cl. .................................................. 350/160 R
[51] Int. Cl. ............................................................ G02f 1/28
[58] Field of Search .................................................. 350/160

[56] References Cited

UNITED STATES PATENTS 3,575,492  4/1971  Nester .................................. 350/160
3,519,330  7/1970  Heilmeier ........................... 350/160

Primary Examiner—Ronald L. Wibert
Assistant Examiner—V. P. McGraw
Attorney—H. Christoffersen

[57] ABSTRACT

A pair of amplifiers and a load such as a liquid crystal connected between the output electrodes of the amplifiers. In response to one relationship between the input signals to the amplifiers, an alternating turn-on voltage is applied via at least one of the amplifiers to the liquid crystal for causing it to scatter light. In response to another relationship between said input signals, the light scattering produced by the liquid crystal is reduced to a relatively low value.

15 Claims, 9 Drawing Figures

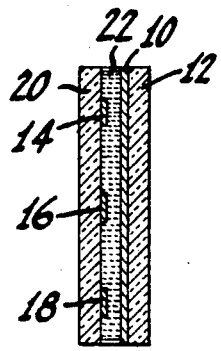
Fig.1.
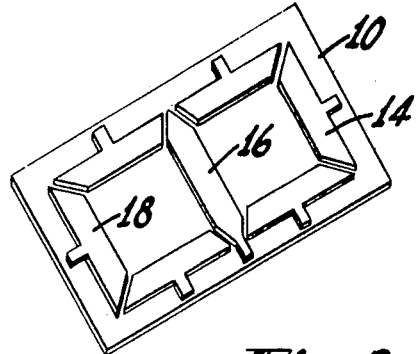
Fig.2.
Fig.3.
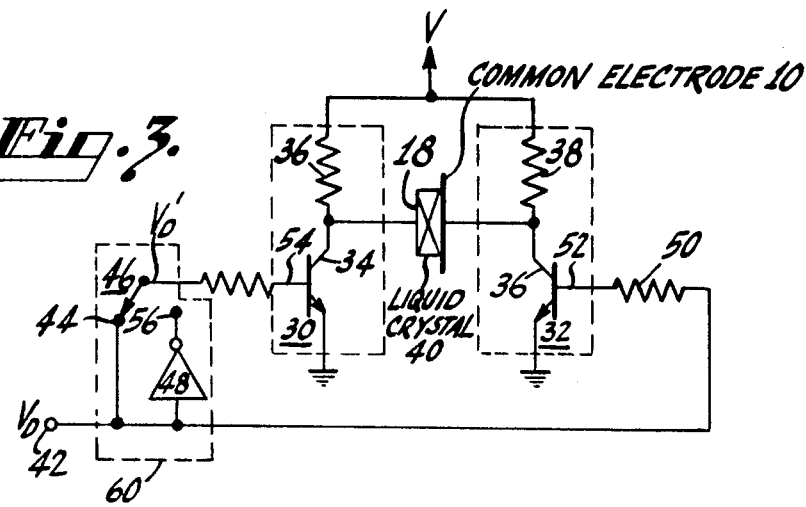
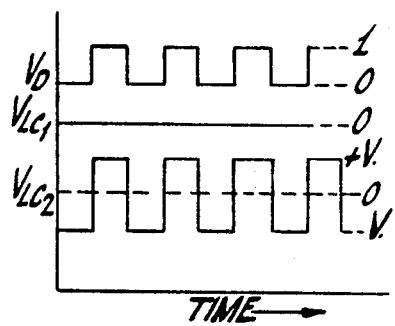
Fig.4.
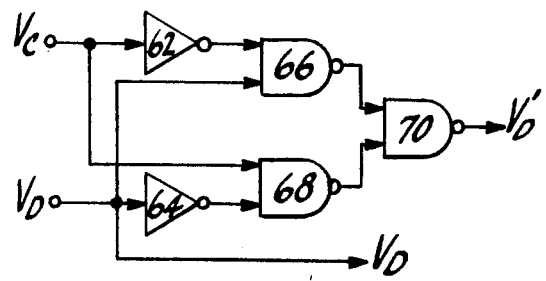
Fig.6.
INVENTOR.
ROGER A. MAO
BY
Attorney INVENTOR.
ROGER A. MAO
BY
Samuel Cole
Attorney

CIRCUITS FOR DRIVING LOADS SUCH AS LIQUID CRYSTAL DISPLAYS

BACKGROUND OF THE INVENTION

Wide interest has been shown in recent years in the use of liquid crystals, such as those of the nematic type which operate on the principle of dynamic scattering, for applications such as alpha-numeric displays, automated advertising displays, light shutters, mirrors and so on. It has been shown that the operating life of such nematic liquid crystals can be increased many times by employing alternating voltage excitation rather than direct voltage excitation. The object of the present invention is to provide improved circuits for applying such alternating voltage excitation to loads such as liquid crystals.

SUMMARY OF THE INVENTION

A pair of amplifying means each having a control electrode, an input electrode and an output electrode and a load such as a liquid crystal connected between said output electrodes. In response to one relationship of signals applied to said control electrodes, an alternating turn-on voltage is applied via at least one of said amplifying means to said load and in response to another relationship between said input signals, the light scattering produced by the load, when a liquid crystal, is reduced to a relatively low value.

BRIEF DESCRIPTION OF THE DRAWING

FIG. 1 is a cross-section through a known liquid crystal display;

FIG. 2 is a perspective, schematic showing of certain elements of the display of FIG. 1;

FIG. 3 is a schematic drawing of a circuit according to one embodiment of the invention;

FIG. 4 is a drawing of waveforms present in the circuit of FIG. 3;

FIG. 6 is a logic diagram showing in more detail an alternate form of a portion of the circuit of FIG. 3;

DETAILED DESCRIPTION

Figure 5:
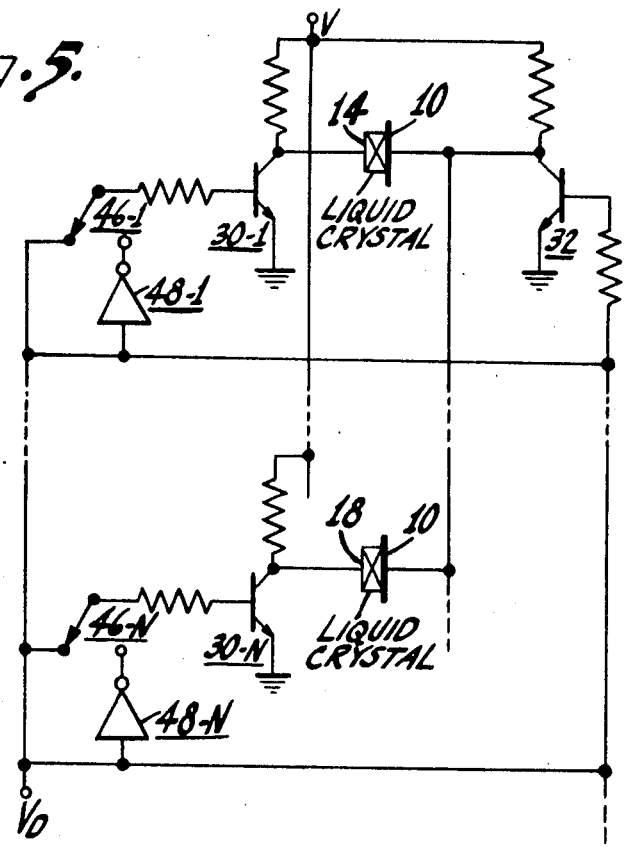
FIG. 5 is a schematic drawing of a circuit operating on the same principle as the circuit of FIG. 3 but for applying alternating voltage excitation to a plurality of liquid crystals loads.

A conventional liquid crystal display is shown in FIGS. 1 and 2. It includes a conductive backplate electrode 10, which may be opaque, located on the inner surface of glass plate 12 and a plurality of transparent conductors, three of which are shown at 14, 16, and 18 located on the inner surface of a second glass plate 20. A liquid crystal 22 of the nematic type which operates on the principle of dynamic scattering, is located between the two glass plates. A detailed discussion of this material and its principles of operation appears in the article "Dynamic Scattering: A New Electrooptic Effect. . ." by G. H. Heilmeier, L. A. Zanoni, and L. A. Barton, PROCEEDINGS OF THE IEEE, Volume 56, No. 7, July, 1968.

FIG. 2 shows only the backplate electrode 10 and the frontplate segments which are spaced from one another and which are spaced from the backplate by the liquid crystal. The particular display element illustrated is a seven segment numeric display.

In the operation of the display of FIGS. 1 and 2, when a direct voltage of sufficient amplitude or a relatively low frequency alternating voltage, such as one at 60 hertz, of appropriate amplitude, is applied between a segment such as 18 and the backplate 10, turbulence is created in the liquid crystal 22 in the region thereof between the segment 18 and the backplate 10 and light scattering occurs at this region. When the voltage is removed, the liquid crystal relaxes to its original condition and the light scattering reduces to a relatively low value—so low that the liquid crystal looks essentially transparent. The time required for this relaxation to take place is of the order of tens to hundreds of milliseconds. The relaxation, that is, the erasure of the liquid crystal scattering effect can be speeded up by applying a relatively high-frequency alternating voltage to the crystal, say one of the order of from 2 to 20 kilohertz. All of this is well-known and not part of the present invention.

A circuit according to one embodiment of the invention is shown in FIG. 3. It includes two amplifying inverters, NPN-transistors 30 and 32, each connected at its emitter to ground. The collectors 34 and 36 of the transistors are connected via resistors 36 and 38, respectively, to a direct voltage source indicated by the letter V. A liquid crystal load 40 is connected between the two collectors 34 and 36. The common backplate electrode is shown by a heavy line at 10 and in this case the frontplate electrode, such as 18, is located at the opposite surface of the liquid crystal. The circuit also includes an input terminal 42 to which an unipolarity alternating voltage such as a square wave $V_D$ may be applied. (The wave shape is not critical and may, for example, be a biased sinusoidal wave instead). This voltage goes to one terminal 44 of a switch 46, to an inverter 48 and, via resistor 50, to the base 52 of transistor 32.

In the operation of the circuit of FIG. 3, with the switch 46 in the position shown, the square wave $V_D$ is applied in the same phase to the bases 52 and 54 of transistors 30 and 32. Thus, both transistors go on and off together (they are operated in "push-push" or common mode) so that the voltage appearing at the collectors 34 and 36 rise and fall together. In other words, the difference in voltage $V_{LC_1}$ appearing across the liquid crystal is zero, as shown in FIG. 4, and the liquid crystal remains in its unexcited, that is, its erased condition.

The liquid crystal 40 may be turned on by throwing switch 46, that is, by placing the switch arm at terminal 56. Now the alternating driving voltage $V_D$ is applied in one phase to the base 52 and in the opposite phase to the base 54. Accordingly, the two amplifiers 30 and 32 are operated in push-pull or differential mode and a relatively large amplitude turn-on voltage, $V_{LC_2}$ in FIG. 4, appears across the liquid crystal. This causes the crystal dynamically to scatter light.

While for purposes of the explanation above, the circuit of FIG. 3 is shown to include a mechanical switch and an inverter, in practice an all electronic control circuit, such as the logic gates shown in FIG. 6, is preferred. The FIG. 6 circuit is substituted for all of the elements within the dashed block 60 of FIG. 3.

The circuit of FIG. 6 includes two inverters 62 and 64 and three NAND gates 66, 68, and 70. The control voltage $V_C$ is applied to inverter 62 and NAND gate 68 and the unipolarity alternating driving voltage $V_D$ which varies in amplitude between ground, representing binary 0, and a positive value, representing binary 1, is applied to the inverter 64 and the NAND gate 66.

In the operation of the circuit of FIG. 6, when $V_C$ represents binary 0, inverter 62 applies a signal representing binary 1 to NAND gate 66, and NAND gate 68 produces an output representing a 1 regardless of the value of $V_D$. When $V_D$ represents a 0, NAND gate 66 produces a 1 output accordingly, when both the $V_D$ and $V_C=0$, $V_D'$ also represents a 0. When $V_D$ represents a 1 at the same time that $V_C$ is a 0, NAND gate 66 produces a 0 output so that $V_D'$ also represents a 1. Thus, it is clear that when $V_C$ represents binary 0, $V_D'=V_D$, and it is as if the switch 46 is in the position shown in FIG. 3. In other words, the amplifiers 30 and 32 operate in push-push. It can be shown in similar fashion that when $V_C$ represents binary 1, $V_D'=\overline{V_D}$. In this case therefore, the amplifiers 30 and 32 of FIG. 3 operate in push-pull and the liquid crystal is "turned on."

The truth table for the circuit of FIG. 6, as is clear from the circuit analysis above, is as follows:

| $V_C$ | $V_D$ | $V_D'$ |
|---|---|---|
| 0 | 0 | 0 |
| 0 | 1 | 1 |
| 1 | 0 | 1 |
| 1 | 1 | 0 |

This is the truth table for a logic circuit commonly known as an EXCLUSIVE OR circuit.

An operating advantage of the circuit of FIG. 3 is that only one amplifier 32 is needed for an entire display such as shown in FIG. 2. In addition, separate amplifiers such as 30, each with its own switch and inverter (or with the equivalent means of FIG. 6), are needed for the respective frontplate electrodes 14, 16 and so on. A circuit of this type in which two of N amplifiers 30–1 to 30–N for N such electrodes are illustrated, is shown in FIG. 5. The operation of this circuit should be clear from the explanation that already has been given. In brief, when it is desired to erase a particular liquid crystal element, its switch 46 is placed in the position shown in FIG. 5 and when it is desired to turn-on a liquid crystal element, its switch 46 is changed in position so that the inverter 48 for that element is in the circuit.

A disadvantage of the circuits of FIGS. 3 and 5 is that substantial current flows through resistors 36 and 38 in both the "off" and light scattering states of the liquid crystal. In other words, power is wasted. The circuit of FIG. 7 which employs complementary symmetry inverters, largely overcomes this difficulty.

Figure 7:
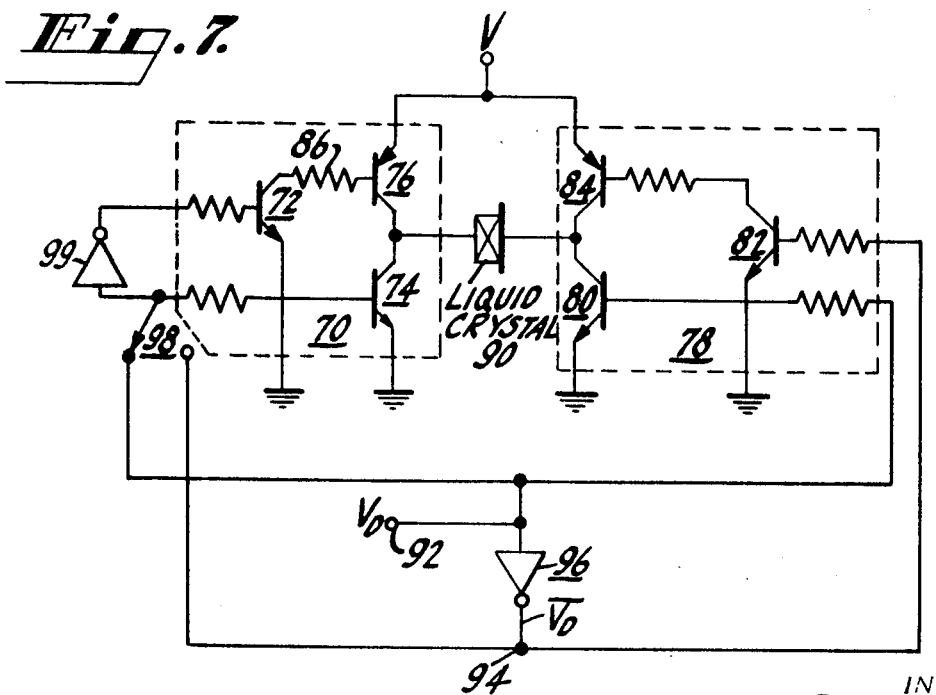
FIG. 7 is a schematic drawing of another embodiment of the present invention.

In the circuit of FIG. 7, the inverter amplifier 70 includes two NPN-transistors 72 and 74 and a PNP-transistor 76. Similarly, the inverter amplifier 78 includes two NPN-transistors 80 and 82 and a PNP-transistor 84. Transistor 72 is connected at its emitter to ground and at its collector to the base of transistor 76 via resistor 86. The emitter of transistor 76 is connected to a source of operating potential $V$ and the collector of transistor 76 is connected to the collector of transistor 74. The emitter of transistor 74 is connected to ground. The amplifier 78 is similarly interconnected. The liquid crystal load 90 is connected between the collectors of transistors 74 and 80.

In the operation of the circuit of FIG. 7, an alternating voltage driving signal $V_D$ is applied to input terminal 92 and a complementary driving signal $\overline{V_D}$ is applied to input terminal 94 via inverter 96. With switch 98 in the position shown, when $V_D$ goes high, transistors 74 and 80 are forward biased. During this same period, $\overline{V_D}$ goes low turning off transistor 82 and inverter 99 applies a low to the base of transistor 72 turning it off. Thus, transistor 76 and 84 are turned off so that no power is lost. When $V_D$ goes low, transistors 74 and 80 are cut off. During this period, $\overline{V_D}$ goes high, forward biasing transistors 72 and 82. Accordingly, a small amount of emitter to base current flows through the emitter-to-base diode of transistor 76, resistor 86 and the emitter to collector path of transistor 72 and a small amount of base current flows also through transistor 84 and the collector-to-emitter path of transistor 82 to ground, but these amounts of current are not very significant. Current does not flow through the emitter to collector paths of transistors 76 and 84, as transistors 74 and 80 are cut off.

When switch 98 is thrown to the other position, push-pull operation results. For example, when $V_D$ is high and $\overline{V_D}$ is low, transistor 80 is forward biased and transistor 74 is cut off. Transistor 72 is forward biased and it turns on transistor 76. Accordingly, current flows through the emitter-to-collector path of transistor 76 and the liquid crystal element 90 and through the emitter to collector path of transistor 80. Thus, a voltage is applied across the liquid crystal in one direction for exciting the liquid crystal. During the next half cycle, transistors 74 and 84 are turned on permitting a voltage in the opposite direction to develop across the liquid crystal 90.

Figure 8:
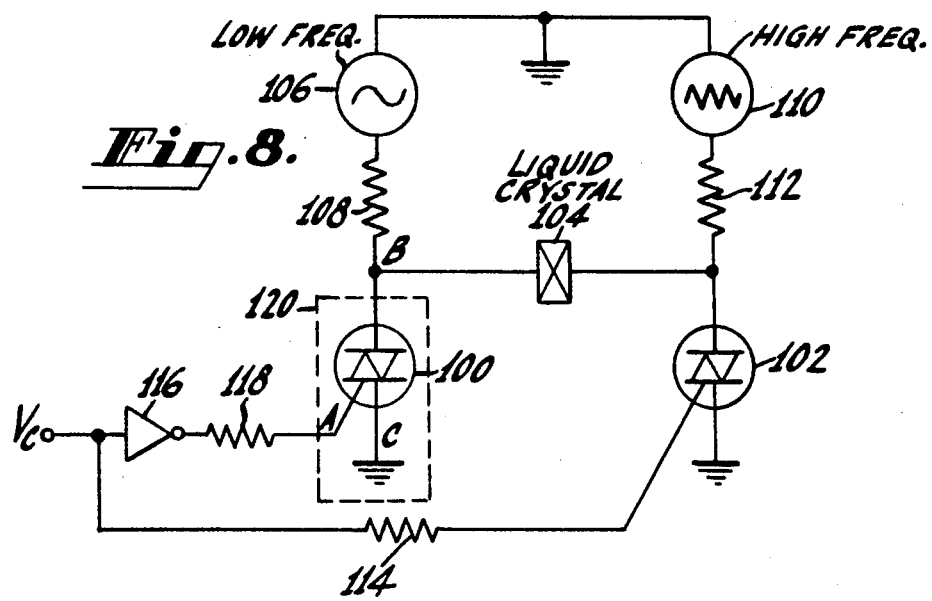
FIG. 8 is a schematic drawing of another embodiment of the present invention.

The embodiment of the invention shown in FIG. 8 employs unipolarity alternating voltage excitation just as the circuit already described. However, as contrasted to the previous circuits, the FIG. 8 circuit employs fast alternating voltage turn-off rather than permitting the liquid crystal naturally to relax to its erased condition. The circuit of FIG. 8 includes two triacs 100 and 102 connected at their first anode to ground and at their 2nd anode to liquid crystal element 104. A source 106 of low frequency alternating current is connected to triac 100 through resistor 108. A source 110 of high frequency alternating voltage is connected to triac 102 via resistor 112. A direct voltage $V_C$ is applied via resistor 114 to the control or gate electrode of triac 102 and its complement is applied via inverter 116 and resistor 118 to the control electrode of triac 100. The low frequency may be some frequency of say up to 100 hertz or so and the high frequency may be in the tens of kilohertz range—a 20 kHz. signal being suitable for example. In both cases sine waves or square waves as shown at $V_D$ in FIG. 4 or other alternating signals are suitable.

When the voltage $V_C$ is of a high value to turn-on triac 102, the inverter 116 applies a low signal to the control electrode of triac 100 to turn-off this triac. In this case, the low frequency alternating voltage produced by source 106 passes through resistor 108 and the liquid crystal element 104 and the triac 102. This voltage is of an amplitude sufficient to cause dynamic scattering to occur. The high frequency erase alternating voltage provided by source 110 passes through resistor 112 and triac 102 to ground and has essentially no effect on the liquid crystal 104.

When it is desired to erase the liquid crystal, the value of the voltage $V_C$ is changed to a low value such that triac 102 is turned off and triac 100 is turned on. Now the high frequency turn-off signal from source 110 passes through resistor 112 and through the liquid crystal 104 to ground via the triac 100. This causes the liquid crystal quickly to be erased. The low frequency voltage from source 106 passes through resistor 108 and triac 100 to ground and has essentially no effect on the liquid crystal 104.

Figure 9:
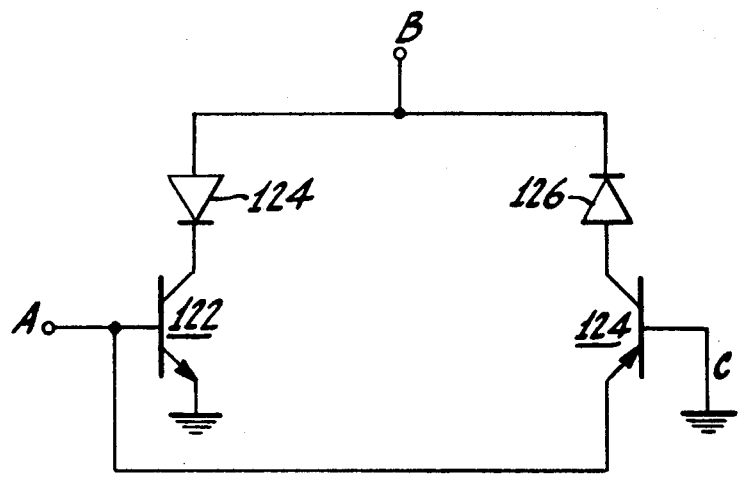
FIG. 9 is a schematic showing to illustrate how the circuit of FIG. 8 may be modified by the substitution of transistors and diodes for triacs.

It is desirable in driving displays such as the one shown in FIGS. 1 and 2 that the amplifying elements be integrated in one package. At the present state of the technology, triacs are not integratable. Accordingly, in these applications it is advantageous to substitute for the triacs 100 and 102 semiconductor devices which can be integrated. FIG. 9 shows a suitable circuit, that is, the circuit of FIG. 9 may be substituted for the triac within dashed block 120 and a similar circuit such as shown in FIG. 9 may be substituted for triac 102.

The circuit of FIG. 9 includes complementary symmetry transistors, that is, NPN-transistor 122 and PNP-transistor 124. Transistor 122 is connected through diode 124 to terminal B and transistor 124 is connected through diode 126 to terminal B. The diodes 124 and 126 are poled in the forward direction with respect to the collector-to-emitter paths of their respective transistors. The diodes 124 and 126 are used to circumvent the inherently low base-emitter avalanche breakdown, that is, about 6 volts, of transistors 122 and 124.

In the operation of the circuit of FIG. 9, when the signal applied to terminal A is high, transistor 122 conducts when the voltage at B goes relatively positive and transistor 124 conducts when the voltage at B goes relatively negative. The circuit, in other words, when so biased, operates as a bidirectional circuit. On the other hand, when A is made low so that zero base current flows, both transistors 122 and 124 are cut off.

It should be clear from the explanation above that the FIG. 9 circuit may be substituted into the FIG. 8 circuit and operation generally similar to that described for FIG. 8 obtained.

The circuit in FIG. 8 cannot be used with liquid crystal displays with a common backplate. In other words, with an arrangement such as shown in FIG. 8, rather than having a continuous backplate conductor such as 10 in FIG. 2, there would have to be discrete backplate electrodes corresponding in shape to the discrete frontplate electrodes shown, and each such pair of electrodes would have to be driven by a circuit such as shown in FIG. 8.

In the claims which follow, the term "amplifying means" is employed in its broad sense and is intended to be generic to circuits employing transistors, triacs or other semiconductor devices as well as to circuits employing discharge devices such as triodes or the like.

I claim:

1. In combination:
   a pair of amplifying means, each having a control electrode, an input electrode and an output electrode;
   a liquid crystal load having two terminals and connected at one terminal to one of said output electrodes and at the other terminal to the other of said output electrodes;
   means for applying operating voltages to said amplifying means coupled to their input and output electrodes;
   means for applying signals having one relationship to the respective control electrodes of said pair of amplifying means for causing an operating voltage to be applied to said liquid crystal load via at least one of said amplifying means for causing said load to scatter light; and
   means for applying signals having another relationship to the respective control electrodes of said pair of amplifying means for reducing to a low value the light scattering produced by said liquid crystal load.

2. In the combination as set forth in claim 1, said means for applying operating voltages comprising a direct voltage source, said means for applying signals having one relationship comprising means for applying an alternating signal of one phase to one control electrode and of opposite phase to the other control electrode, and said means for applying signals having another relationship comprising means for applying an alternating signal of the same phase to both control electrodes.

3. In the combination as set forth in claim 2, said amplifying means comprising transistor amplifiers, and said output electrodes comprising collector electrodes.

4. In the combination as set forth in claim 1, said means for applying operating voltages comprising means for applying a relatively low frequency turn on voltage to one amplifier means and means for applying a relatively high frequency erase voltage to the other amplifier means, said means for applying signals having one relationship comprising means for applying an enabling signal to the control electrode of the amplifying means to which said high frequency signal is applied and a disabling signal to the other control electrode, and said means for applying signals having another relationship comprising means for applying an enabling signal to the control electrode of the amplifying means to which said relatively low frequency signal is applied and a disabling signal to the other control electrode.

5. In the combination as set forth in claim 4, said amplifying means comprising triacs.

6. In the combination as set forth in claim 2, each amplifying means comprising three transistors, each having an emitter, base and collector, two of said transistors being of opposite conductivity types and being connected collector-to-collector, and said liquid crystal load being connected to said common collector connection, and the third transistor being connected at its emitter to the emitter of the transistor of same conductivity type and at its collector to the base of the transistor of opposite conductivity type, the base of said third transistor comprising the control electrode of said transistor amplifier.

7. In combination:
   a pair of amplifying means, each having a control electrode, an input electrode and an output electrode;
   a load connected between said two output electrodes;
   means connected to said input and output electrodes for applying operating power to said amplifying means;
   means for producing an alternating voltage across said load comprising means for applying an alternating signal of phase to one control electrode and of opposite phase to the other control electrode; and
   means for reducing to substantially zero the alternating voltage appearing across said load comprising means for applying alternating signals of the same phase to both of said control electrodes.

8. In the combination as set forth in claim 7, said load comprising a liquid crystal.

9. The combination of a liquid crystal display including a common backplate electrode, a plurality of frontplate electrodes, and a liquid crystal layer between the front and backplate electrodes, with a circuit for selectively applying alternating voltage excitation between said front and backplate electrodes, said circuit including:
   first amplifying means having a control electrode, an input electrode and an output electrode, connected at its output electrode to said backplate electrode;
   a plurality of amplifying means of the same type as said first amplifying means, each connected at its output electrode to a different frontplate electrode;
   means for applying a direct operating voltage between the input and output electrodes of each amplifying means;
   means for applying an alternating voltage to the control electrode of said first amplifying means; and
   means for selectively applying to the control electrode of each other amplifying means an alternating voltage which is either in phase with or substantially 180° out of phase with the alternating voltage applied to said first amplifier means.

10. In the combination as set forth in claim 9, each amplifying means comprising a transistor inverter circuit.

11. In combination:
    a liquid crystal display comprising a common electrode, a plurality of electrode segments, and a liquid crystal layer between said common electrode on the one hand and said electrode segments on the other hand;
    means continuously applying an alternating voltage to said common electrode; and
    means selectively applying to said electrode segments an alternating voltage which is in-phase with or out-of-phase with, the voltage applied to said common electrode, whereby those regions of the liquid crystal between said common electrode and electrode segments receiving an alternating voltage in-phase with the voltage applied to said common electrode remain unexcited and those regions of the liquid crystal between said common electrode and electrode segments receiving a voltage out-of-phase with the voltage applied to said common electrode become excited and scatter light.

12. In the combination as set forth in claim 11, said means continuously applying an alternating voltage to said common electrode comprising means producing a unipolarity alternating voltage.

13. In the combination as set forth in claim 12, said means selectively applying to said electrode segments an alternating voltage which is in-phase with or out-of-phase with the voltage applied to said common electrode comprising logic circuit means.

14. In the combination as set forth in claim 13, said logic circuit means including logical inverter means.

15. In the combination as set forth in claim 13, said logic circuit means comprising EXCLUSIVE OR circuits, each EXCLUSIVE OR circuit having two input terminals to one of which said alternating voltage is applied, said voltage varying in amplitude between values representing binary 1 and binary 0, and further including means for applying to the other terminal of each EXCLUSIVE OR circuit a control voltage which represents binary 1 when it is desired that an out-of-phase voltage be produced and binary 0 when it is desired that an in-phase voltage be produced.

* * * * *

UNITED STATES PATENT AND TRADEMARK OFFICE
CERTIFICATE OF CORRECTION

PATENT NO. : 3,653,745

DATED : April 4, 1972

INVENTOR(S) : Roger Alain Mao

It is certified that error appears in the above-identified patent and that said Letters Patent is hereby corrected as shown below:

Claim 7, Col. 6, line 2    after "signal of" insert --one--

*Signed and Sealed this*

*Fourteenth* Day of *September 1982*

[SEAL]

*Attest:*

GERALD J. MOSSINGHOFF

*Attesting Officer*    *Commissioner of Patents and Trademarks*